United States Patent
Baur et al.

[11] Patent Number: 6,057,284
[45] Date of Patent: May 2, 2000

[54] ISO-TRIDECANOLALKOXYLATES IN BLOCK FORM AS LOW-FOAM OR ANTIFOAMING SURFACTANTS

[75] Inventors: Richard Baur, Mutterstadt; Helmut Gümbel, Dannenfels; Bernd Burkhart, Mutterstadt; Martin aus dem Kahmen, Ludwigshafen; Ulrich Kaluza, Neckargemünd; Klaus Taeger, Freinsheim, all of Germany

[73] Assignee: BASF Aktiengesellschaft, Ludwigshafen, Germany

[21] Appl. No.: 09/194,423

[22] PCT Filed: May 27, 1997

[86] PCT No.: PCT/EP97/02741

§ 371 Date: Nov. 30, 1998

§ 102(e) Date: Nov. 30, 1998

[87] PCT Pub. No.: WO97/46311

PCT Pub. Date: Dec. 11, 1997

[30] Foreign Application Priority Data

May 30, 1996 [DE] Germany .......... 196 21 843

[51] Int. Cl.⁷ .................................. C11D 1/722
[52] U.S. Cl. ............................... 510/506
[58] Field of Search ................. 510/506, 421, 510/422

[56] References Cited

U.S. PATENT DOCUMENTS 2,934,568 4/1960 Barker ................... 260/615
4,280,919 7/1981 Stoeckigt et al. .
5,259,963 11/1993 Wiedemann .

FOREIGN PATENT DOCUMENTS

| 0 003 183 | 1/1979 | European Pat. Off. . |
| 0 019 173 | 11/1980 | European Pat. Off. . |
| 2 641 476 | 7/1990 | France . |
| 2 209 559 | 6/1973 | Germany . |
| 719445 | 12/1954 | United Kingdom . |
| 2 196 632 | 10/1987 | United Kingdom . |
| WO 92/14808 | 9/1992 | WIPO . |

*Primary Examiner*—Lorna M. Douyon
*Assistant Examiner*—John R. Hardee
*Attorney, Agent, or Firm*—Oblon, Spivak, McClelland, Maier & Neustadt, P.C.

[57] ABSTRACT

Isotridecanol block alkoxylates I

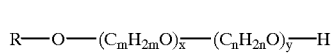

(I)

where
R is isotridecyl,
m is 2 when n is 3 or 4, or
m is 3 or 4 when n is 2, and
x and y are independently of each other from 1 to 20,
subject to the proviso that x is not less than y when m=2 and n=3 or 4,
are useful as low-foam or foam-suppressing surfactants, especially in detergent and cleaner formulations and for chemical-technical applications.

10 Claims, No Drawings

ISO-TRIDECANOLALKOXYLATES IN BLOCK FORM AS LOW-FOAM OR ANTIFOAMING SURFACTANTS

DESCRIPTION

The present invention relates to the use of isotridecanol block alkoxylates having an ethylene oxide block and a propylene oxide or butylene oxide block as low-foam or foam-suppressing surfactants, especially in detergent and cleaner formulations and for chemical-technical applications. The present invention further relates to detergent and cleaner formulations comprising these isotridecanol block alkoxylates.

Nonionic surfactants based on alkoxylates and block alkoxylates of long-chain alcohols of natural or synthetic origin are essential constituents of customary detergent and cleaner formulations. Similarly, block alkoxylates of isotridecanol are known in principle.

For instance, DE-A 22 09 559 (1) describes an adduct of 2 mol of ethylene oxide and 4 mol of propylene oxide with isotridecanol as a component in agents for foam control, for example for use in polymer dispersions and in the coatings, paper and food industries.

Furthermore, WO-A 92/14808 (2) recommends the use of a mixture of two similar alkoxylated long-chain alcohols, the long-chain alcohols each having first been reacted with ethylene oxide and then with propylene oxide, as foam-suppressing surfactant in cleaners for mechanical cleaning processes and in rinse aids for mechanical ware cleaning. The long-chain alcohols mentioned as candidates for alkoxylation include isotridecanol. In the block alkoxylates disclosed in (2), the degree of propoxylation is always higher than the degree of ethoxylation; for instance, Example 1 of (2) describes an adduct of 3.5 mol of ethylene oxide and 5.5 mol of propylene oxide with a $C_{13}/C_{15}$ oxo alcohol.

Similarly, derivatives of isotridecanol block alkoxylates are known in the art. For instance, GB-A 2 196 632 (3) describes isotridecanol alkoxylates having a propylene oxide block, an ethylene oxide block and a phosphoric ester end group. These surface-active agents are recommended for use as wetting agents in the pretreatment of textile materials in the textile-making industry. EP-A 003 183 (4) discloses block alkoxylates, of isotridecanol among others, having a propylene oxide block, an ethylene oxide block and a hydrophilic end group such as sulfate, sulfonate, phosphate or carboxylate. These surface-active agents are used in petroleum production.

However, known surfactants based on alkoxylates of long-chain alcohols in the field of detergents and cleaners and in the field of chemical-technical applications have a number of disadvantages. For instance, particularly physical and application properties such as surface tension, wetting power and foam behavior are in need of improvement. Also, the known agents usually have a relatively high ecotoxicological hazard potential, especially with respect to aquatic organisms.

It is an object of the present invention to provide surfactants for the detergent and cleaner sector and for chemical-technical applications without the aforementioned disadvantages.

We have found that this object is achieved by the use of isotridecanol block alkoxylates of the general formula I

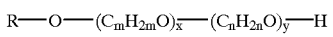

(I)

where
R is isotridecyl,
m is 2 when n is 3 or 4, or
m is 3 or 4 when n is 2, and
x and y are independently of each other from 1 to 20,
subject to the proviso that x is not less than y when m=2/n=3 or 4,
as low-foam or foam-suppressing surfactant.

The isotridecanol (isotridecyl alcohol) is of synthetic origin in that it is produced by oligomerization of suitable lower olefins and subsequent oxo reaction (hydroformylation). For instance, isobutylene, 1-butylene, 2-butylene or mixtures thereof can be catalytically trimerized, propylene catalytically tetramerized or 2-methyl-1-pentene catalytically dimerized. The $C_{12}$ olefins thus obtainable are then converted to the homologous $C_{13}$ alcohol, for example by means of CO and $H_2$ over a suitable catalyst.

The bulk of the isotridecanol comprises primary $C_{13}$ alkanols having at least 3, especially 4, branches (alkyl side chains). In general they are tetramethylnonanols, for example 2,4,6,8-tetramethyl-1-nonanol or 3,4,6,8-tetramethyl-1-nonanol. Ethyldimethylnonanols such as 5-ethyl-4,7-dimethyl-l-nonanol can also be present.

However, the underlying alcohol component need not be just pure isotridecanol; homologous mixtures of branched $C_{11}$ to $C_{14}$ alkanols comprising isotridecanol as main component are also suitable. Such homologous mixtures are formed under certain conditions in the course of the above-described oligomerization of lower olefins and subsequent oxo reaction. A typical composition of such a mixture is as follows:

branched $C_{11}$ alkanol (isoundecanol) 2–15% by weight
branched $C_{12}$ alkanol (isododecanol) 15–35% by weight
isotridecanol 55–75% by weight
branched $C_{14}$ alkanol (isotetradecanol) 1–10% by weight.

The isotridecanol used in the present invention must be distinguished from the "$C_{13}/C_{15}$ oxo alcohols", which are mixtures of corresponding linear olefins, i.e. α-dodecene and α-tetradecene, which have been hydroformylated. The resulting $C_{13}$ and $C_{15}$ alkanols are linear or have not more than one side chain.

The degrees of alkoxylation x and y, which in general are averages, since the alkylene oxide units are usually present in a random distribution with a frequency maximum, are preferably independently of each other from 1.5 to 12. By means of specific alkoxylation catalysts, for example modified bentonites or hydrotalcites, as described in WO-A 95/04024, the random distribution can be narrowed to such an extent that narrow range alkoxylates are obtained.

The disclosed isotridecanol block alkoxylates I are either ethylene oxide-propylene oxide or -butylene oxide adducts of the formula Ia

(Ia)

where n = 3 or 4 or propylene oxide- or butylene oxide-ethylene oxide adducts of the formula Ib $$R\text{—}O\text{—}(C_mH_{2m}O)_{\overline{x}}\text{—}(C_2H_4O)_{\overline{y}}\text{—}H. \quad \text{(Ib)}$$

where m = 3 or 4

If m or n is equal to 3 or 4, the preference is for 3 (propylene oxide block).

The ratio between x and y, which plays a part in determining the balance between hydrophilic and hydrophobic moieties, is not less than 1 in the adducts Ia; preferably, the ratio of x to y is within the range from 1:1 to 4:1, especially within the range from 1.5:1 to 3:1.

The ratio of x and y in adducts Ib is somewhat less critical and is generally within the range from 1:3 to 3:1, preferably within the range from 1:1.5 to 3:1.

The disclosed isotridecanol block alkoxylates I are preferably used as nonionic surfactants in detergent and cleaner formulations and in surfactant-including formulations for chemical-technical applications, for example for cleaning processes in industry and the home as well as for textile washing or for cleaning processes in the food sector such as the cleaning of beverage bottles or of containers or equipment in the food-processing industry or in ware cleaners. Of particular interest here is the cleaning of hard surfaces composed for example of glass, ceramic, paint, plastic or metal. The surfactants I are also used in technical cleaners and in cleaning processes in the metal-processing industry.

The surfactants I can also be used with advantage for a multiplicity of other chemical-technical processes, for instance generally in the metal-processing industry, for example in cooling lubricants,
hardening media,
hydraulic oil emulsions,
polishing pastes,
mold release agents,
drawing media,
pickling media,
metal cleaners,
metal driers.

Here the surfactants I can be specifically used with advantage in those processes where high thermal stability is required.

The surfactants I can further be used in the making and processing of textiles. The use of surfactants in the making and processing of textiles is very wide, extending in the main to the fields of pretreatment agents for fibers,
production of rayon fibers,
spin finishes and textile lubricants,
dyeing assistants,
softeners,
water repellents,
printing assistants,
antistats,
flocking and coating compositions.

The surfactants I can further be used in the leather, paper, printing, electroplating and photographic industries. Important fields of application here are coatings, pigments and printing inks. Surfactants are used in these applications not only in aqueous but also in nonaqueous systems. In nonaqueous systems, they are chiefly effective as dispersants, antisettling agents or flow control agents. In addition, surfactants make it possible to produce high-solids systems. Surfactants have a larger proportion in aqueous systems, in which they not only serve to stabilize the polymeric binder dispersions prepared by emulsion addition or condensation polymerization but also to assist the dispersion of organic and inorganic pigments frequently present. In addition, they improve the adhesion properties of these coatings.

The surfactants I can also be used in water treatment, for example in wastewater cleanup.

The surfactants I can further be used in crop protection formulations.

The compounds I can further be used as surfactants or emulsifiers in the plastics-making and plastics-processing industry. The main fields of application in plastics making and processing are production of polymer dispersions,
production of bead polymers,
production of foam plastics,
use of surface-active mold release agents,
production of microcapsules,
improving the adhesion between fillers and plastics,
additions to polymer dispersions to achieve special effects such as foamability, filler compatibility or wetting power,
emulsifiers for nonaqueous systems,
coloring of plastics,
antistatic finishing of plastics,
adhesives.

The present invention likewise provides detergent and cleaner formulations which, as well as the customary constituents, include from 0.1 to 40% by weight, in particular from 5 to 30% by weight, especially from 10 to 25% by weight, based on the total amount of the formulation, of at least one isotridecanol block alkoxylate I as surfactant. In addition, these formulations may include further nonionic surfactants, but also cationic, anionic and/or amphoteric surfactants. The customary constituents of detergent and cleaner formulations are known to those skilled in the art and therefore need not be discussed here any further.

The disclosed isotridecanol block alkoxylates I usually exhibit a remarkably low interfacial tension, especially with respect to apolar oils such as engine oils (important for application in technical cleaners) or fatty oils such as olive oil (important for application in manual ware cleaners), which is very highly correlated with a high fat-dissolving power, is effective to reduce the surface tension and results in a very low critical micelle concentration. They generally exhibit good wetting power in respect of hard surfaces and very good wetting power on textile surfaces. In the wash they usually produce minimal foam, which makes them suitable for textile detergents, especially washing powders. Even in mechanical and manual cleaning processes they generally generate little foam, usually act foam-suppressingly and are usually effective in bringing about rapid foam disintegration.

The disclosed isotridecanol block alkoxylates I are readily biodegradable and toxicologically substantially safe; more particularly, their aquatic toxicity is significantly lower than that of comparable commercial products.

EXAMPLES

The following isotridecanol block alkoxylates were prepared and tested in respect of their application properties:

isotridecyl-O-$(C_2H_4O)_x$—$(C_3H_6O)_y$—H

Examples No. 1–12

| Example No. | x | y | Cloud point (cp) [° C.] | Surface tension [mN/m] | Foam suppression behavior [rpm] |
|---|---|---|---|---|---|
| 1 | 6.0 | 3.0 | 46.5 | 28.3 | 79 |
| 2 | 6.3 | 3.1 | 47.0 | 29.1 | 71 |
| 3 | 6.0 | 4.0 | 42.0 | 29.3 | 72 |

-continued

| Example No. | x | y | Cloud point (cp) [° C.] | Surface tension [mN/m] | Foam suppression behavior [rpm] |
|---|---|---|---|---|---|
| 4 | 4.0 | 3.0 | 38.5 | 28.9 | 73 |
| 5 | 4.0 | 4.0 | 35.0 | 29.4 | 74 |
| 6 | 5.0 | 4.0 | 38.5 | 29.3 | 72 |
| 7 | 5.0 | 3.0 | 42.0 | 29.0 | 68 |
| 8 | 9.0 | 3.0 | 54.0 | 28.5 | 64 |
| 9 | 12.0 | 3.0 | 60.5 | 30.7 | 33 |
| 10 | 6.0 | 4.5 | 40.0 | 28.9 | 75 |
| 11 | 9.0 | 4.5 | 48.0 | 28.9 | 80 |
| 12 | 12.0 | 4.5 | 54.0 | 30.3 | 65 | isotridecyl-O-$(C_3H_6O)_x$—$(C_2H_4O)_y$—H

Examples No. 13–19

| Example No. | x | y | Cloud point (cp) [° C.] | Surface tension [mN/m] | Foam suppression behavior [rpm] |
|---|---|---|---|---|---|
| 13 | 4.0 | 1.7 | 35.0 | 28.7 | 108 |
| 14 | 4.5 | 1.5 | 30.5 | 28.6 | 107 |
| 15 | 4.5 | 3.0 | 45.5 | 28.5 | 92 |
| 16 | 4.5 | 4.5 | 54.5 | 28.7 | 63 |
| 17 | 3.0 | 1.5 | 29.0 | 27.3 | 106 |
| 18 | 3.0 | 3.0 | 45.5 | 27.8 | 93 |
| 19 | 3.0 | 4.5 | 56.5 | 27.9 | 59 |

The cloud point was determined in butyldiglycol by the method of DIN 53 917. This involves determining the temperature above which the solution turns cloudy and is thus present as a mixture of two liquid phases. The lower the cloud temperature, the lower the foaming tendency.

The surface tension was determined in accordance with DIN 53 924 by measuring the force in mN/m required to pull a plate or a horizontally suspended ring from the liquid surface.

The foam suppression behavior in the dishwasher was tested by means of the "egg test". In this test, magnetic induction measurement is used to count the number of revolutions of a spraying arm in a domestic dishwasher with the aid of a counter. Foaming, which occurs in particular in the presence of proteins, reduces the speed of the arm. Because of the reduced thrust, the speed of the arm is thus a measure of the suitability of surfactants for use in high-agitation cleaning equipment. To test the foam suppression behavior, an egg is added to the wash liquor. The test time is 12 min, and the average number of revolutions per minute is calculated from the total number of revolutions. The wash is started at room temperature, but after about 10 min the temperature of the wash liquor is 60° C.

The isotridecyl radical used in Examples 1 to 19 represents the isomeric mixture of branched $C_{13}$ alkanols produced in the trimerization of a mixture of 1-butylene and 2-butylene and subsequent hydroformylation.

The substances of Examples 1 to 19 were prepared by the following methods:

Example 1

An autoclave was charged initially with 200 g of isotridecanol (corresponding to 1.0 mol) together with 0.2 g of potassium hydroxide as alkoxylation catalyst. 264 g of ethylene oxide gas (corresponding to 6.0 mol) were continuously introduced at from 110 to 120° C. To complete the reaction, the batch was subsequently stirred at the same temperature for 1 h. Then 174 g of propylene oxide (corresponding to 3.0 mol) were added continuously at from 130 to 140° C. The batch was subsequently allowed to react at that temperature for 2 h. 638 g were obtained of the substance of Example 1. The substances of Examples 2 to 12 were prepared in a similar manner.

Example 13

An autoclave was charged initially with 200 g of isotridecanol (corresponding to 1.0 mol) together with 0.2 g of potassium hydroxide as alkoxylation catalyst. 232 g of propylene oxide gas (corresponding to 4.0 mol) were continuously introduced at from 130 to 140° C. To complete the reaction, the batch was subsequently stirred at the same temperature for 1 h. Then 75 g of ethylene oxide (corresponding to 1.7 mol) were added continuously at from 110 to 120° C. The batch was subsequently allowed to react at that temperature for 2 h. 507 g were obtained of the substance of Example 13. The substances of Examples 14 to 19 were prepared in a similar manner.

We claim:

1. A process for producing low-foam or foam-suppressing surfactant-including formulations, which comprises including in these formulations at least one isotridecanol block alkoxylate I of the general formula I:

$$R\text{—}O\text{—}(C_mH_{2m}O)_x\text{—}(C_nH_{2n}O)_y\text{—}H \tag{I}$$

wherein

R is isotridecyl which is mainly based on primary $C_{13}$ alkanols having at least 3 branches, m and n are independently 2, 3 or 4, and m is 2 when n is 3 or 4, or m is 3 or 4 when n is 2, and x and y are independently of each other from 1 to 20, with the proviso that x is not less than y when m=2, and n=3 or 4.

2. The process as claimed in claim 1, wherein x and y are independently of each other from 1.5 to 12.

3. The process as claimed in claim 1, wherein x and y are in a ratio of from 1:1 to 4:1 when m=2, n=3 or 4.

4. The process as claimed in claim 1, wherein x and y are in a ratio of from 1:3 to 3:1 wherein m=3 or 4, and n=2.

5. The process as claimed in claim 1, wherein R represents an isomeric mixture of branched $C_{13}$ alkanols produced in the trimerization of a mixture of 1-butylene and 2-butylene and subsequent hydroformulation.

6. A laundry detergent and cleaner formulation comprising from 0.1 to 40% by weight, based on the total amount of the formulation, of at least one isotridecanol block alkoxylate I represented by formula (I) as surfactant:

$$R\text{—}O\text{—}(C_mH_{2m}O)_x\text{—}(C_nH_{2n}O)_y\text{—}H \tag{I}$$

wherein

R is isotridecyl which is mainly based on primary $C_{13}$ alkanols having at least 3 branches, m and n are independently 2, 3 or 4, and m is 2 when n is 3 or 4, or m is 3 or 4 when n is 2, and x and y are independently of each other from 1 to 20, with the proviso that x is not less than y when m=2, and n=3 or 4.

7. The laundry detergent and cleaner formulation of claim 6, wherein R represents an isomeric mixture of branched $C_{13}$ alkanols produced in the trimerization of a mixture of 1-butylene and 2-butylene and subsequent hydroformulation.

8. The laundry detergent and cleaner formulation in claim 6, wherein x and y are independently of each other from 1.5 to 12.

9. The laundry detergent and cleaner formulation in claim 6, wherein x and y are in a ratio of from 1:1 to 4:1 when m=2, and n=3 or 4.

10. The laundry detergent and cleaner formulation in claim 6, wherein x and y are in a ratio of from 1:3 to 3:1 when m=3 or 4. and n=2.

* * * * *